United States Patent Office

3,474,114
Patented Oct. 21, 1969

3,474,114
TELOMERS OF MALEIC ANHYDRIDE AND PROCESS FOR PREPARING THEM
Alfred Kuhlkamp and Gerhard Werner, Hofheim, Taunus, Germany, assignors to Farbwerke Hoechst Aktiengesellschaft vormals Meister Lucius & Bruning, Frankfurt am Main, Germany, a corporation of Germany
No Drawing. Continuation-in-part of application Ser. No. 365,175, May 5, 1964. This application May 16, 1968, Ser. No. 729,512
Claims priority, application Germany, May 9, 1963, F 39,687
Int. Cl. C08f 3/48
U.S. Cl. 260—347.3          7 Claims

ABSTRACT OF THE DISCLOSURE

A process for the production of telomers of maleic anhydride wherein maleic anhydride as a taxogen is telomerized at a temperature within the range of 105° to 210° C. under the action of a free radical forming compound in the presence of a hydrocarbon as a telogen and a telomer of maleic anhydride having a molecular weight within the range of from 300 to 3,000 is formed.

---

This application is a continuation-in-part of U.S. application Ser. No. 365,175 filed May 5, 1964, now abandoned and relates to telomers of maleic anhydride and to a process for preparing them.

It is known that monomer maleic anhydride can be copolymerized with other polymerizable vinyl compounds such as, for example, styrene or vinyl acetate, to yield products of high molecular weight. Copolymerization of the two components generally takes place in a molar ratio of 1:1.

Now we have found a process for the preparation of telomers of maleic anhydride in the presence of free radical-forming compounds as catalysts, in which maleic anhydride as taxogen is telomerized at temperatures of at least 105° C., preferably at temperatures within the range of from 150° C. to 210° C., dissolved in one or in several chain-transferring solvents as telogen or telogens. In the process of the present invention the maleic anhydride can be heated in the solvent to the reaction temperature together with the peroxide. However, it has proved to be advantageous to pump the catalyst at the reaction temperature into the solution of the taxogen in the telogen. In a preferred form of the process, there is first heated the maleic anhydride together with the solvent to the reaction temperature and the catalyst solution is then added continuously as the reaction proceeds. Generally the monomers applied are completely converted in the course of 1 to 2 hours. Owing to the last-mentioned method it is possible to adjust the molecular weight more precisely. Depending on the molecular weight, the telomer formed precipitates or remains in solution. Products of low molecular weight generally remain in solution.

The molecular weight of the telomers depends on the solvent, the reaction temperature and the amount of catalyst applied and lies within the range of from 300 to 3000, preferably 300 to 1200. Depending on the boiling point of the solvent, the reaction is carried out under atmospheric or superatmospheric pressure, preferably under a gas that is inert to the reaction, for example nitrogen or noble gases.

The polymaleic anhydrides (telomers) of low molecular weight obtained according to the process of the present invention still contain, according to present knowledge, per molecule at least one chemically-bonded molecule of the solvent. These telomers react with water to yield the corresponding acids. When the telomers react with anhydrous alcohols, for example anhydrous methanol, ethanol, propanol and the like, semi-esters are formed; when the telomers react with aqueous inorganic bases such, as for example, sodium hydroxide or potassium hydroxide, the corresponding salts are formed; when the telomers react with anhydrous amines, the amide ammonium salts are formed.

For the preparation of polymaleic anhydride of low molecular weight there are suitably used those chain-transferring solvents that do not react with the anhydride group. Solvents of this type are preferably saturated aliphatic hydrocarbons having 4 to 30 carbon atoms, at least one of the carbon atoms being a tertiary carbon atom, for example isobutane, isohexane, isooctane, isohexadecane, isopentacosane and isotriacontane, furthermore alkyl benzenes or alkyl naphthalenes. In the case of monoalkyl benzenes or monoalkyl naphthalenes, the alkyl residue contains 3 to 10 carbon atoms, while in the case of polyalkylated, preferably dialkylated, benzene or naphthalene the alkyl residues contain 1 to 5 carbon atoms. The said compounds are solvents that exhibit a strong chain-transferring action and are, therefore, effective telogens.

Cumene, diisopropyl benzene, and xylene are used with special advantage as solvents, because of their pronounced tendency for the transfer of chains; they are, therefore, very effective as telogens.

The solutions used in the process of the invention generally contain 10 to 60%, preferably 20 to 40% of maleic anhydride, calculated on the weight of the solution.

Free radical forming compounds which may be used as catalysts are organic peroxides, such as dialkyl peroxides, for example di-tert.-butyl-peroxide, diacyl peroxides such as dilauroyl peroxide, dibenzoyl peroxide, and also hydroperoxides, such as cumene hydroperoxide, tert.-butyl-hydroperoxide or azo compounds such as, for example, azo-bis-isobutyronitrile. Especially effective are dialkyl peroxides such as di-tert.-butyl-peroxide and alkyl hydroperoxides such as tert.-butyl-hydroperoxide. The catalysts are generally applied in amounts within the range of from 0.5 to 10%, preferably 1 to 5%, calculated on the weight of maleic anhydride.

The telomers prepared according to the invention can be used with excellent success in the form of their ammonium salts as textile size. Low molecular weight polyesters obtained by reacting the telomers of the invention with polyhydric alcohols, for example ethylene glycol or glycerol, or low molecular weight polyamides obtained by reacting the telomers of the invention with polyamines, for example ethylene diamine or hexamethylene diamine, are likewise very well suitable as textile size. The suitability of higher molecular weight polycarboxylic acids, such as polyacrylic acid, as textile size or the use of a styrene/maleic anhydride-copolymer as textile size or as emulsifier are disclosed, for example in the publications of Pummerer, "Chemische Textilfasern, Filme and Folien," publishers Ferdinand Enke, Stuttgart 1953, page 1086, or K. Lindner "Tenside, Textilhilfsmittel-Waschrohstoffe," Stuttgart 1964, page 1045. Furthermore, the telomers prepared according to the invention are very well suitable as starting materials for producing polycondensation products, which for example according to French Patent No. 1,380,208 which are excellent raw materials for lacquers and varnishes.

The following examples serve to illustrate the invention, but they are not intended to limit it thereto:

EXAMPLE 1

Apparatus:
Glass autoclave (capacity: 1 liter), provided with stirrer, thermometer, heating jacket, connection for pressure charging valve, pressure charging valve.

Charge:
- Maleic anhydride _____ grams__ 100
- Cumene _____ cc__ 350

Catalyst solution
- Di-tert.-butyl-peroxide _____ gram__ 1
- Cumene _____ cc__ 50

Maleic anhydride and cumene were placed in the autoclave at room temperature and the mixture was heated to 180° C. Temperature of the jacket: 200° C. The pressure in the closed apparatus was about 2 atmospheres gage. When a temperature of 180° C. had been attained, the catalyst solution was introduced into the reaction mixture through the pressure charging valve in the course of 1 hour. After the addition of the catalyst solution, heating was continued for one hour, and then the reaction mixture was cooled to room temperature. The cumene was distilled off in vacuo and the residue dried in vacuo at 150° C. and 0.5 mm. Hg pressure. The yield amounted to 150 grams of crude product which was soluble in water or aqueous ammonia. Molecular weight of the telomer: 330.

EXAMPLE 2

Apparatus: (As used in Example 1).

Charge:
- Maleic anhydride _____ grams__ 200
- Xylene _____ cc__ 400

Catalyst solution
- Di-tert.-butyl-peroxide _____ grams__ 2
- Xylene _____ cc__ 150

Maleic anhydride and xylene were placed in the autoclave at room temperature and the mixture was heated to 180° C. Temperature of the jacket: 200° to 210° C. Then the catalyst solution was pumped into the apparatus, which was under a pressure of about 2 atmospheres gage, over a period of 90 minutes; during this time, the reaction temperature rose to about 190° C. Heating was continued for one hour after complete addition of the catalyst solution; then the reaction mixture was cooled to room temperature. The solvent xylene was distilled off and the residue dried in vacuo at 150° C. and 0.5 mm. Hg pressure. The crude product obtained weighed 240 grams; it was soluble in water or dilute aqueous ammonia. The telomer had a molecular weight of 545.

EXAMPLE 3

Apparatus: (As used in Example 1).

Charge:
- Maleic anhydride _____ grams__ 200
- p-Xylene _____ cc__ 350

Catalyst solution
- Tert.-butyl-hydroperoxide _____ grams__ 2
- p-Xylene _____ cc__ 150

Telomerization as described in Example 1.
- Yield of crude product _____ grams__ 195
- Molecular weight of the telomer _____ 630

Soluble in water and dilute aqueous ammonia.

EXAMPLE 4

Apparatus: (As used in Example 1).

Charge:
- Maleic anhydride _____ grams__ 200
- Xylene _____ cc__ 350

Catalyst solution
- Di-tert.-butyl-peroxide _____ gram__ 1
- Xylene _____ cc__ 150

Telomerization as described in Example 2.
- Yield of crude product _____ grams__ 230
- Molecular weight of the telomer _____ 810

Soluble in water and dilute aqueous ammonia.

EXAMPLE 5

Apparatus: (As used in Example 1).

Charge:
- Maleic anhydride _____ grams__ 100

Solvent:
- Branched aliphatic hydrocarbon having a boiling range of 180° to 200° C. _____ cc__ 250

Catalyst solution
- Di-tert.-butyl-peroxide _____ grams__ 6

Solvent:
- Branched aliphatic hydrocarbon having a boiling range of 190° to 205° C./760 mm. Hg.

Maleic anhydride and the solvent were placed in the autoclave at room temperature and the mixture was heated to 175° C. Temperature of the jacket: 200° to 210° C. When an internal temperature of 175° C. had been attained, the catalyst solution was metered in. The rate of metering in the catalyst was chosen such that the total catalyst solution was added in the course of about 7 hours, the internal temperature rising to about 190° C. within this period. The telomer separated as a brown oil which solidified on cooling. After distilling off the solvent and drying the residue in vacuo at 150° C. under 0.5 mm. Hg pressure, a crude product was obtained in a yield of 110 grams, which dissolved in water and dilute aqueous ammonia. The molecular weight was 600.

What is claimed is:

1. A process for preparing telomers of 10 to 60%, calculated on basis of reaction solution, of maleic anhydride having molecular weights from 300–3,000, said process comprising the steps of telomerizing at a temperature within the range of 105° to 210° C. in the presence of 0.5 to 10%, calculated on the weight of maleic anhydride, a free radical forming compound selected from the group consisting of di-tert.-butyl-peroxide, dilauroyl peroxide, dibenzoyl peroxide, cumene hydroperoxide, tert.-butyl-hydroperoxide and azo-bis-isobutyronitrile, the maleic anhydride being dissolved in a chain transfer solvent as a telogen, said solvent being a member selected from the group consisting of saturated aliphatic hydrocarbons having 4 to 30 carbon atoms, at least one of said carbon atoms being a tertiary carbon atom, monoalkyl benzene having an alkyl group containing 3 to 10 carbon atoms, monoalkyl naphthalene having an alkyl group containing 3 to 10 carbon atoms, polyalkyl benzene having alkyl groups containing 1 to 5 carbon atoms, and polyalkyl naphthalene having alkyl groups containing 1 to 5 carbon atoms.

2. The process as defined in claim 1, wherein the free radical forming compound is di-tert.-butyl-peroxide.

3. The process as defined in claim 1, wherein the free radical forming compound is tert.-butyl-hydroperoxide.

4. The process as defined in claim 1, wherein the telogen used is cumene.

5. The process as defined in claim 1, wherein the telogen used is xylene.

6. The process as defined in claim 1, wherein the telogen used is a branched aliphatic hydrocarbon with a boiling range of from 180 to 200° C.

7. A telomer of maleic anhydride produced according to the method of claim 1 and having a molecular weight within the range of from 300 to 1,200.

References Cited

Chemical Abstracts—Abstract of British Patent 668,574, vol. 47 (1952), p. 2211e.

NICHOLAS S. RIZZO, Primary Examiner

BERNARD I. DENTZ, Assistant Examiner

U.S. Cl. X.R.

8—115.6; 117—139.5; 252—8.6; 260—78.4